3,120,959
UNITIZED FACE TYPE ROTARY SEAL
Hans Jensen, River Forest, and Raymond H. Andresen, Barrington, Ill., assignors to Gits Bros. Mfg. Co., Chicago, Ill., a corporation of Illinois
Filed Feb. 27, 1961, Ser. No. 91,913
2 Claims. (Cl. 277—37)

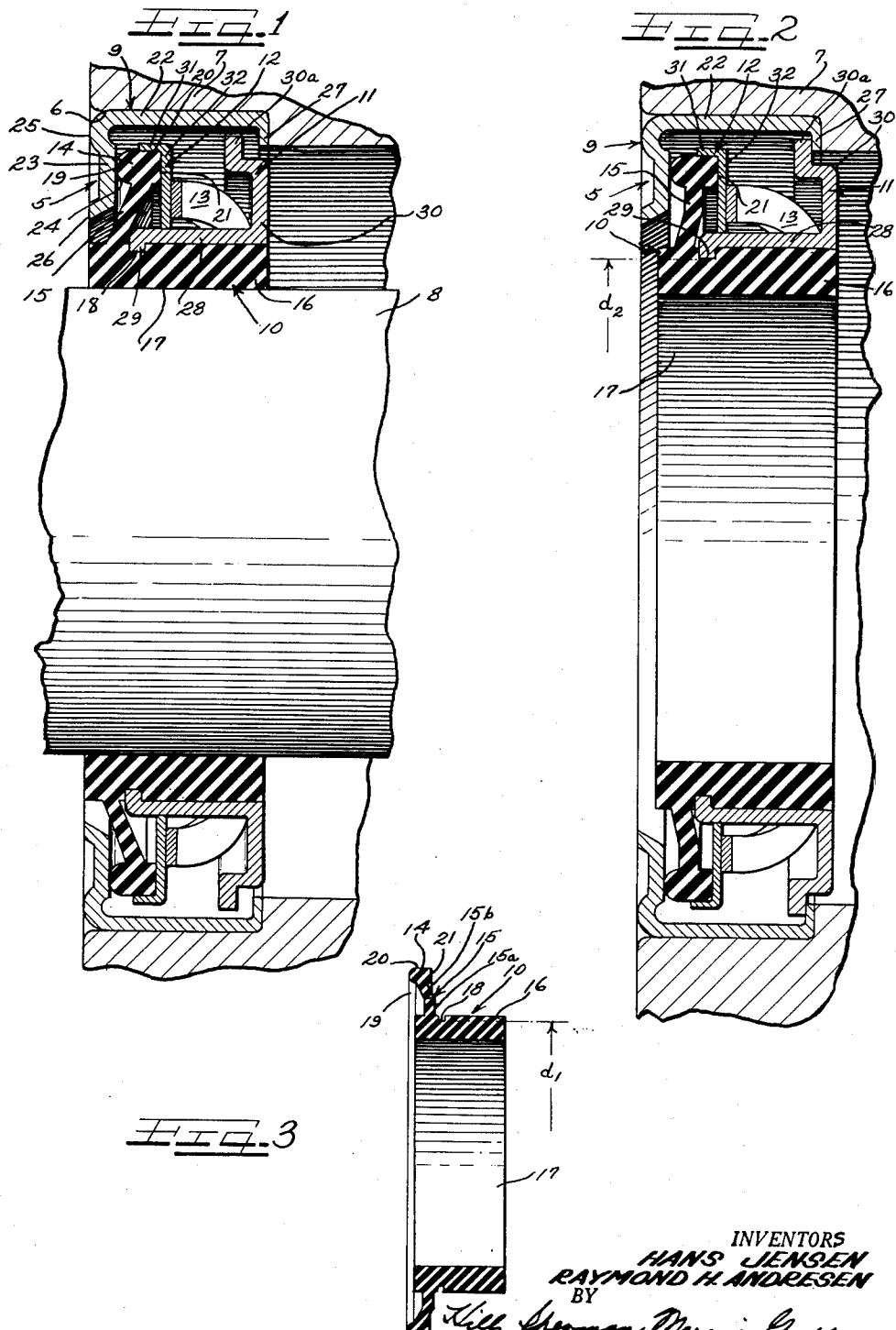
Feb. 11, 1964     H. JENSEN ETAL     3,120,959
UNITIZED FACE TYPE ROTARY SEAL
Filed Feb. 27, 1961
INVENTORS
HANS JENSEN
RAYMOND H. ANDRESEN
BY
ATTORNEYS United States Patent Office 3,120,959
Patented Feb. 11, 1964

This invention relates to a shaft seal or the like in which a seal is effected between a pair of relatively rotatable elements, such as between a shaft and a wall through which the shaft extends.

In such a seal, a stationary sealing member has an annular sealing face and a rotatable member carried on the shaft also has an annular sealing face in sealing engagement with the first face. To provide for relative axial movement of the sealing faces and to compensate for wear of the sealing faces, it is necessary to permit relative axial movement and it is also necessary to maintain a seal between the relatively rotating faces with this axial movement. It is also necessary to provide a secondary seal between axially movable members and their support.

It is an object of the present invention to provide an improved simplified lightweight unit seal cartridge which can be installed at the sealing location by being fitted over a shaft and into an opening in a wall surrounding the shaft.

A further object of the invention is to provide an improved rotary seal in which the axially movable sealing member and its spring member for holding it in sealing engagement rotate with the shaft contrary to the more common practice wherein these members are stationary, and to provide an improved arrangement for rotatably carrying these members.

A further object of the invention is to provide an improved rotary seal wherein the rotating member is formed as a unit of resilient material and performs the functions of gripping a rotating shaft, sealingly engaging a stationary sealing surface with a round nosed sealing bead, and supporting the sealing bead radially outwardly of the shaft for axial movement while forming its own secondary seal preventing leakage due to the axial movement.

Another object of the invention is to provide a rotary seal of simplified construction wherein a lightweight compact unit seal is obtained having a rigid sealing surface engaged by a yieldable sealing member having a rounded sealing nose and wherein the sealing nose is maintained at a fixed position relative to the stationary sealing surface with wear and shifting movements so that a predetermined sealing relationship will be retained.

Other objects and advantages will become more apparent with the teaching of the principles of the invention in connection with the disclosure of the preferred embodiment thereof in the specification, claims and drawings, in which:

FIGURE 1 is a vertical sectional view taken through a seal constructed in accordance with the principles of the present invention and showing the seal mounted in operating position between a shaft and a stationary wall;

FIGURE 2 is a vertical sectional view of the seal of FIGURE 1 showing the parts in position before the seal is mounted on a shaft; and FIGURE 3 is a vertical sectional view of the diaphragm member of the seal assembly with the other parts removed.

As shown on the drawings:

The assembled rotary seal embodying the features of the invention is shown as a unit cartridge 5 press fit into a circular opening 6 in a wall or housing 7. The seal is also pressed over the outer cylindrical surface of a rotary shaft 8 which passes through the opening in the wall 7, FIGURE 1.

The seal cartridge 5 basically incorporates an outer shell 9, a diaphragm member 10, an inner shell 11, a ferrule 12 and a wave spring 13.

The diaphragm member 10 is shown in each of the figures and is shown with the other parts removed in FIGURE 3. The diaphragm member includes a sealing bead 14 which is annular in shape and is positioned radially outwardly of the other parts of the diaphragm member. The diaphragm member also includes a flexible resilient diaphragm 15 which extends in a general radial direction outwardly from a collar 16. The diaphragm member is molded as an entity of a suitable rubber or other flexible material which will withstand the fluid being sealed. For example in a seal constructed to seal aircraft engine oil, a composition known to those skilled in the art and available commercially as Flexan No. 561 has been used. This seal has been used on a shaft of 1" diameter operating at 2,200 r.p.m., sealing aircraft engine oil in a temperature range of 70° to 250° F., sealing a pressure of a 12" head of oil. Inner and outer shells of cold rolled steel were employed with the spring being formed of stainless steel.

The collar 16 has an inner cylindrical surface 17 for frictionally gripping the outer cylindrical surface of the shaft 8 when it is installed in the manner shown in FIGURE 1. An annular notch 18 is formed in the outer surface of the collar 16 behind the diaphragm 15 for receiving and orienting the inner shell 11 as will be described later in greater detail.

The diaphragm 15 is angled in its normal unstressed position slightly to the left, as shown in the drawings which may for the purpose of convenience be referred to as a forward direction. The diaphragm 15 has a radial portion 15a and a forward angled portion 15b.

The diaphragm 15 supports the sealing bead 14 which has a rounded sealing nose 19 which engages a sealing surface 24, as illustrated in FIGURE 1. The sealing nose has a preferred radius of $\frac{3}{32}''$. We have found that if the radius is too great heat is generated to damage the sealing surface, and if the radius is too small that the substantial point or line contact which occurs at the sealing surface has inadequate strength.

The sealing bead 14 has an outwardly facing cylindrical surface 20 and an adjacent rear radial annular surface 21 and these surfaces are utilized for maintaining the bead in an untilted axial position, as will become clear.

The outer shell 9 has a cylindrical portion 22 which is received in a press fit relationship within the opening 6 in the wall 7. A radially inwardly extending flange 23 on the outer shell provides the rearwardly facing annular sealing surface 24. This sealing surface is finished with a 20 micro-inch finish which, as will be recognized by those skilled in the art is a measurement of the root mean square of the depth and length of the wave configuration of the surface. This finish is preferably employed for obtaining a good seal and if a surface with a finer or shinier finish is used the possibilities of continued lubrication of the surface are reduced.

The radial flange 23 is bounded at its inner and outer edge by ridges 25 and 26 which strengthen the flange 23 and maintain it in accurate plane at right angles to the shaft axis.

At the rear end of the outer shell 9 is an inturned holding flange 27 which is engaged by the inner shell 11 to hold the parts together when the seal cartridge 5 is not mounted on a shaft, as shown in FIGURE 2.

The inner shell 11 has a cylindrical portion 28 which fits snugly around the collar 16 to prevent it from expanding and aid in holding it snugly against the shaft 8. At the forward end of the inner shell 11 is an inwardly turned projection 29 which seats in the annular notch 18 in the collar. This projection has an inner diameter, shown at $d_2$ in FIGURE 2 which is less than the inner diameter of the root of the notch 18, shown at $d_1$ in FIGURE 3. This presses the rubber of the collar inwardly clamping it firmly against the shaft 8. When the collar is not on a shaft, as shown in FIGURE 2, its inner diameter will be less than that of the shaft 8 so that it will be sqeezed outwardly when placed on a shaft to frictionally reliably hold the diaphragm member 10 in its correct axial position.

At its rear end the inner shell has an outwardly turned spring supporting and holding flange 30. The holding flange has an outer portion which is bent slightly axially and then turned outwardly at 30a and this portion engages the retaining flange 27 as shown in FIGURE 2 when the seal cartridge 5 is not on a shaft. For installation on a shaft the collar is pushed frictionally along the shaft so that a running clearance space is present between the holding flange portion 30a and the retaining flange 27.

The ferrule 12 has a forward axially extending flange 31 which surrounds the sealing bead 14 and its inner cylindrical surface is in holding contact with the cylindrical surface 20 of the bead. This tends to restrain the bead holding it in an inward radial direction and reinforcing it with high speed rotation. An important function of the ferrule is to hold the bead 14 in its correct axial position and prevent it from tipping. The function of the outer flange 31 is aided by a flange 32 which has a radial forwardly facing surface engaging the rear surface 21 of the bead. When the diaphragm member 10 is placed on a shaft, its position relative to the outer shell 9 may vary and therefore the angle of the diaphragm 15 may vary. The diaphragm is constructed so that its normal position will extend forwardly, as shown in FIGURE 3, and therefore no stresses will be placed in the diaphragm due to the bead 14 moving forwardly with wear and with the force of the spring 13 and instead, it will move toward an unstressed position. The inherent resiliency of the diaphragm also tends to urge the bead toward sealing position against the surface 24. Further, the bead cannot tip since it is held in axial alignment with the axis of the shaft by the ferrule 12. The ferrule also holds the bead in a perfect annular shape.

The spring 13 is compressed between the flange 32 of the ferrule and the holding flange 11 of the inner shell.

Thus a seal unit has been provided which meets the objectives and advantages above set forth, and which is well adapted to being lightweight and relatively small in construction. The unit is formed of few parts and can be manufactured as a cartridge so that the parts are in proper alignment before installation. Further, the sealing bead 14 will always be held at the same radial position and at the same axial angle for different positions relative to the outer shell so that proper sealing engagement between the rounded nose 14 and the sealing face 24 will always be obtained.

The construction of the diaphragm member and the resilient material of which it is constructed may vary slightly with design requirements and a resiliency which is a compromise to obtain flexibility on the diaphragm and collar and to obtain proper wearing hardness for the bead is chosen. A rubber type compound of 70 to 75 durometer hardness has been found to obtain the desirable wearing characteristic of the seal nose 19 and yet provide sufficient resiliency for the diaphragm 15.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A rotary seal for sealing a shaft extending through an opening in a stationary member comprising a diaphragm member formed of an integral resilient material with a collar having an inner cylindrical surface for frictionally holding the member on a shaft, with a radially extending diaphragm supported outwardly of the collar, and with an annular sealing bead at the outer edge of the diaphragm having an axially forwardly facing rounded sealing nose, said diaphragm joining the bead intermediate its axial extremities, an outer shell surrounding the diaphragm and having an outer annular flange to be press fit into an opening in a housing and a radial flange at the forward end having an axially rearwardly facing annular sealing face in sealing engagement with said bead, said radial flange having axially forwardly extending annular reinforcing ridges positioned at the radially inner and outer edges of the sealing face, an inwardly extending retaining flange at the rear end of the outer shell, said diaphragm having a normal unstressed position extending in a forward direction so that the bead will be resiliently pushed forwardly toward the sealing face by the diaphragm, an inner shell surrounding said collar for clamping the collar inwardly against a shaft and having an outwardly extending holding flange for engaging the forward surface of the retaining flange of the outer shell, a ferrule having a radial annular flange positioned behind said bead and a forwardly extending flange radially outside holding said bead radially inwardly so that said bead will not pivot about its support and will not circumferentially expand, and an annular wave spring between said ferrule and the holding flange of the inner shell.

2. A rotary seal member for mounting on a rotating shaft element and for being spring urged into sealing engagement with an annular radial sealing surface, said member comprising a resilient annular mounting collar for supporting the member on said shaft element, a resilient annular flexible diaphragm member projecting substantially radially outwardly from the collar and integral therewith at its inner edge and pivoting in an axial direction substantially about its inner edge, an annular resilient sealing bead at the outer edge of the diaphragm member and integral therewith axially movable into sealing engagement with the annular radial sealing surface, said bead having a rounded sealing nose with a radius and having a cylindrical inner surface and a radial rear surface, said diaphragm member secured to said inner surface between the ends thereof for supporting the sealing bead with a minimum of distortion and angular tilting with axial movement thereof and pivotal movement of the diaphragm member, and a rigid ring having a radial face engaging said rear surface and an annular face engaging the outer surface of the bead preventing it from expanding circumferentially outwardly.

References Cited in the file of this patent

UNITED STATES PATENTS

| | | |
|---|---|---|
| 2,480,464 | Gregoire | Aug. 30, 1949 |
| 2,592,494 | Ullman | Apr. 8, 1952 |
| 2,608,425 | Krug | Aug. 26, 1952 |
| 2,806,720 | Meyer | Sept. 17, 1957 |
| 2,881,015 | Wahl | Apr. 7, 1959 |
| 3,001,807 | Amirault et al. | Sept. 26, 1961 |
| 3,016,251 | Gilbert | Jan. 9, 1962 |

FOREIGN PATENTS

| | | |
|---|---|---|
| 464,974 | Canada | May 9, 1950 |
| 761,815 | Great Britain | Nov. 21, 1956 |